(12) United States Patent
Zernov

(10) Patent No.: US 6,301,822 B1
(45) Date of Patent: Oct. 16, 2001

(54) MAGNETIC RATTLE SYSTEM

(76) Inventor: Jeffrey P. Zernov, 12855 O'Brien Rd. North, Brainerd, MN (US) 56401

( * ) Notice: Subject to any disclaimer, the term of this patent is extended or adjusted under 35 U.S.C. 154(b) by 0 days.

(21) Appl. No.: 09/576,689

(22) Filed: May 23, 2000

(51) Int. Cl.[7] ............................................ A01K 85/00
(52) U.S. Cl. ................................... 43/42.31; 43/42
(58) Field of Search ........................... 43/42–42.52

(56) References Cited

U.S. PATENT DOCUMENTS 5,924,236  *  7/2000  Preston ................................. 43/42.31

* cited by examiner

Primary Examiner—Peter M. Poon
Assistant Examiner—Floris C Copier
(74) Attorney, Agent, or Firm—D. L. Tschida

(57) ABSTRACT

Fishing lures and assemblies that include magnets having pole faces mounted to an axial support to normally repel each other. Lure movement induces axial movement of the magnets and cooperating lure pieces to induce contact and separation and thereby audible sounds. Rattle chambers and/or sound enhancing structures can be provided to amplify created sounds. Magnets of differing shapes are disclosed that are arranged in different lure constructions (e.g. snelled assemblies, crank baits, spoon baits, wire form baits—bottom bouncers and spinner baits, jig lures and bell weights).

20 Claims, 7 Drawing Sheets

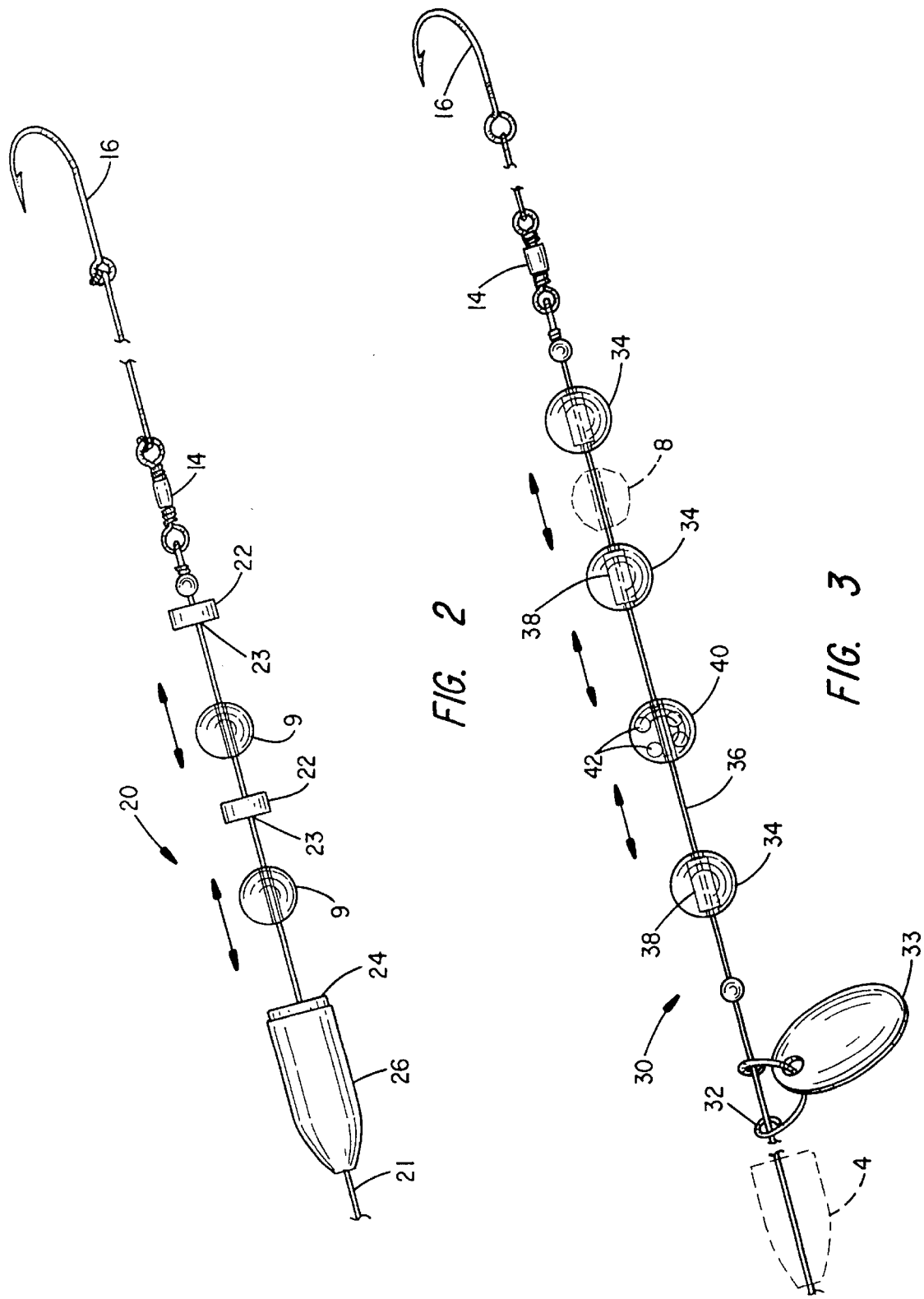

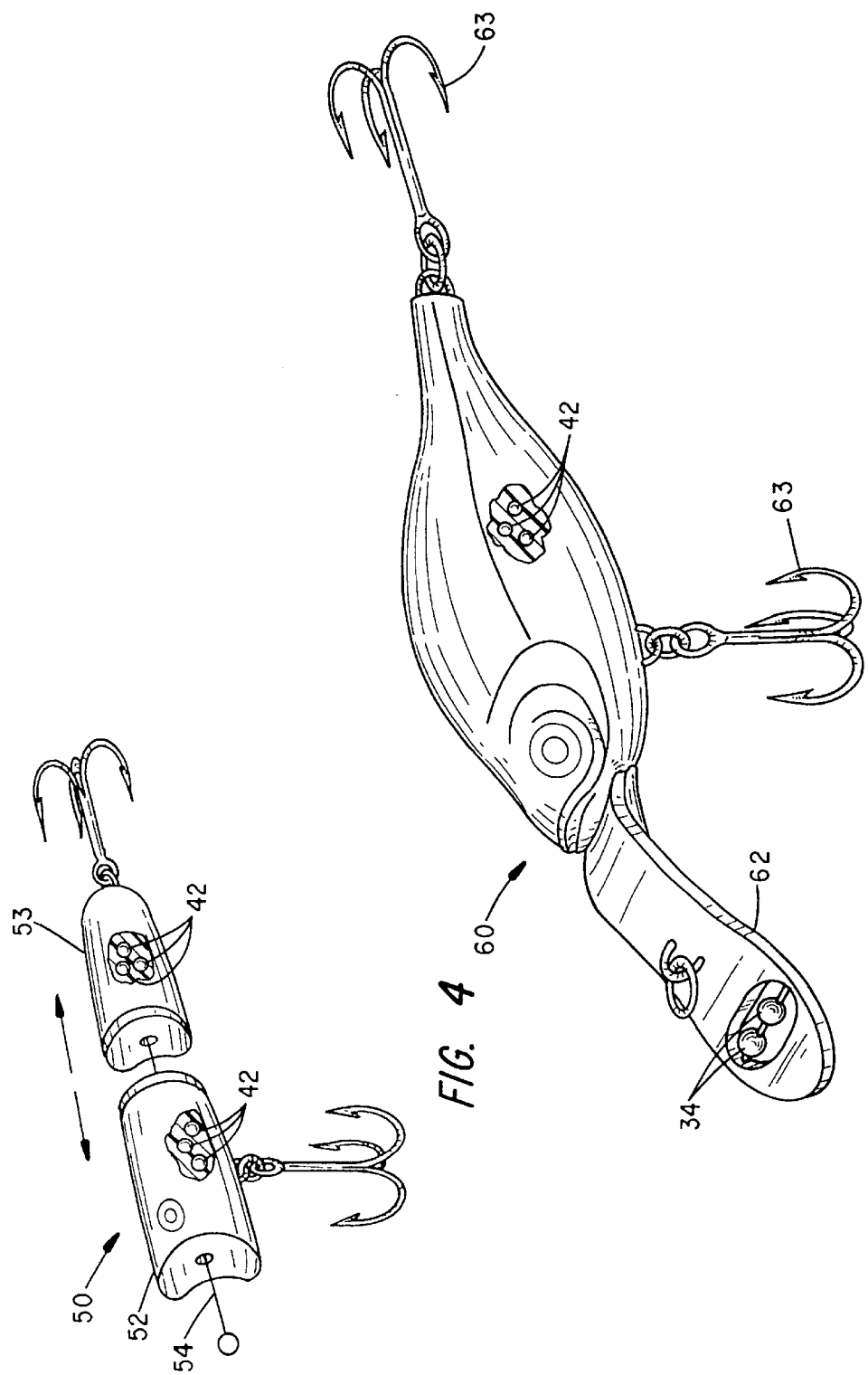

MAGNETIC RATTLE SYSTEM

BACKGROUND OF THE INVENTION

The present invention relates to fishing lures with noise making capabilities and, in particular, to a variety of lures and/or fishing accessories (e.g. snell, spoon bait, spinner bait, crank bait, bottom bouncer, jig, dropper weight) outfitted with repelling magnets that rattle or click with lure movement to create noise.

Noise has been well documented in fishing literature as an attractant to fish. In actual practice, however, water can mute sounds emitted from a lure. Attendant fluid and aerodynamic properties of a lure can affect the emitted sound. Capillary action between adjacent lure parts and lure motion can also cause any sound making parts that are exposed to the water to stick together or move slowly. Parts mounted in watertight chambers overcome the foregoing, but the sounds are muted by the sound insulating properties of the surrounding chambers.

Lures of numerous designs with alternative solutions to the problem have been developed. Such lures include pieces and accessories that are positioned to physically contact each other to emit sounds with lure movement. Many presentations provide capsules or chambers that support rattles. Others provide metal weights and/or glass beads that are mounted to slide to and fro to physically strike each other.

Magnets have also been used in fishing lures. U.S. Pat. Nos. 4,114,305 and 5,987,802 disclose lures with magnetic switches. U.S. Pat. Nos. 4,777,758 and 4,878,310 disclose lures with magnetic accessory retainers and hook retainers.

More relevant to the subject invention is U.S. Pat. No. 5,924,236 and which discloses a lure having a rotating magnet that alternately repels and attracts pivoting fins that contain other magnets.

In distinction to the foregoing lures, the present lures were developed to provide a number of alternative lure constructions wherein the magnets are supported in a linear or co-axial permanent repelling relation to one another. Normal lure movement alternately overcomes the natural repulsive forces to cause the magnets to strike one another before the pole pieces are repelled apart until the next movement of the lure. The opposed magnetic fields particularly overcome capillary and/or gravitational attraction and adhesion forces between adjoining lure pieces.

SUMMARY OF THE INVENTION

It is accordingly a primary object of the invention to provide a fishing lure outfitted with at least one pair of magnetic pole pieces that are mounted in permanent repulsive relation to one another and that strike and repel from each other with normal lure movement.

It is a further object of the invention to provide snell type lures wherein magnet pieces are arranged for reciprocating motion along a filamentary support.

It is a further object of the invention to provide bored magnets, such as beads that either include magnetic core pieces or are magnetized, and that can be attached to snells, crank baits, spoon baits and wire forms.

It is a further object of the invention to provide lures with magnet containing pieces that are constrained to move in a defined association to each other, for example, pivot or flutter in relation to a common anchor point or reciprocate into and out of contact along a common filamentary support.

It is a further object of the invention to provide crank bait lures wherein lure pieces having adjoining magnetic pole pieces are mounted for axial movement along a common support.

Many of the foregoing objects, advantages and distinctions of the invention are obtained in a number of alternative lures and/or fishing accessories. Various arrangements disclose bored magnet pieces that are arranged along a filamentary support for reciprocating motion, such as in "Carolina" rigs or other snell type baits. Other magnetic pole pieces that are mounted in axial (e.g. linear or arcuate) repelling relation to each other are shown at body parts of crank baits, wire form baits, spoon baits, jig heads, flutter baits and a dropper weight.

Still other objects, advantages, distinctions and alternative constructions and/or combinations of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE DRAWINGS

FIG. 2 shows an improved Carolina rig outfitted with repelling magnets.

FIG. 3 is a perspective drawing showing a snell containing a number of magnetic beads arranged to repel each other.

FIG. 4 is a perspective drawing showing a multi-section crank bait lure fitted to a sliding support and wherein the body parts are arranged to repel each other.

FIG. 5 is a perspective drawing showing a fishing lure wherein repelling magnets are supported to a member at a bill piece.

Similar structure at the drawings is referred to with the same reference numerals and/or characters.

DESCRIPTION OF THE PREFERRED EMBODIMENT

Figure 1:
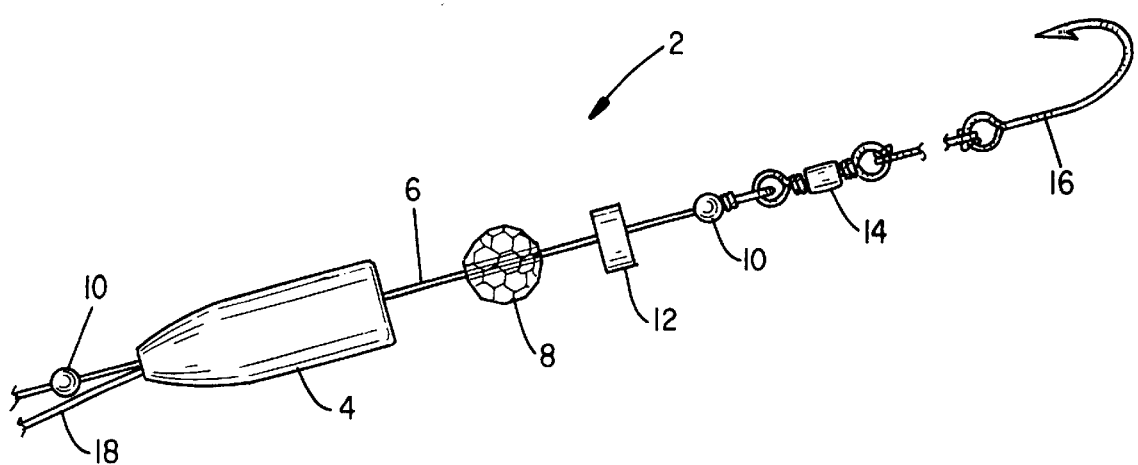
FIG. 1 shows a prior art Carolina rig outfitted with repelling magnets.

Referring to FIG. 1, a prior art Carolina rig 2 is shown. The rig 2 provides a relatively heavy forward weight 4 that is mounted to slide along a filamentary support 6, such as a wire or fish line, in relation to any preferred arrangement of beads 8 and 10 and disk spacers 12 or other accessory pieces that are also secured to the support 6. The weight 4 can be constructed to any desired shape from any of a variety of materials, for example, lead, brass or stainless steel. A swivel 14 and hook 16 are also secured to the support 6. A peg 18 can be used to secure the weight at desired location along the support 6. In normal use, the sliding of the weight 4 and consequent contact with and between the beads 8 and spacer 12 creates audible sounds.

FIG. 2 shows an improved Carolina rig 20 of the present invention outfitted with magnets 22 at a filamentary support 21. The support 21 is threaded through bores 23 in the magnets 22. Plastic or glass beads 9 are threaded onto the support 21 between the magnets 22. The "north" and "south" poles of the magnets 22 are positioned to repel each other. A separate magnet piece 24 is secured to a forward weight 26.

As the rig 20 is drawn through the water, the weight 26 slides back toward the hook 16, which forces the magnets 24 and 22 together, and creates a clicking or clacking sound as contact is made with the beads 9. With each release of line tension, the beads 8 and magnets 22 and 24 are repelled to assure sufficient separation to create noise with the next intermittent pull on the support 21.

FIG. 3 shows a snell assembly 30 wherein a clevis 32 secures a spinner blade 34 to a support 36 that terminates in a hook 16. A swivel 14 can be used or not in front of the hook 16 as desired. A series of beads 34 are threaded to the support 36. A magnetic core piece 38 is provided at each bead 34. The poles of the core pieces 38 are arranged to repulse each other with any release of line tension. A bead 40 is also shown that includes a number of rattle pieces 42. Alternating contact and repulsion between the beads 34 and 40 produces audible sounds to attract fish. The sound and flash qualities of the assembly 30 are enhanced by the presence of the spinner blades 34. Live bait can also be secured to the hook 16. It is to be appreciated that a variety of shapes of commercially available rattle capsules can be used with or instead of the bead 40.

Although the beads 34 are constructed with tubular magnetic cores 38, the beads 34 can be constructed entirely of magnetic materials. For example, metallic beads can also be provided that are appropriately magnetized. The beads 34 can also be molded with several discrete magnets and to any of a variety of shapes. Non-magnetic, glass or plastic beads 8 or 9 or other types of sound enhancing devices can also be strung along the support 36.

FIG. 4 discloses a crank bait 50 that has two body pieces 52 and 53 that slide along a filamentary support 54. Magnets 56 are secured to the body pieces 52 and 53 such that the pieces 52 and 53 are normally repelled from each other. The magnets 56 can be secured to the exterior surfaces of the body pieces 52 and 53 or can be mounted internal to the body pieces 52 and 53, as preferred. Rattle pieces 42 can also be contained within chambers at the body pieces 52 and 53.

FIG. 5 discloses another crank bait 60 that supports a bill piece 62 and treble hooks 63. The bill piece 62 causes the bait 60 to submerge and wobble side-to-side as the bait 60 is drawn through the water by a fish a line attached to the ring 66. Bead-type magnets 34 are supported to a wire support 64 at the bill piece 62 and create audible sounds with the wobbling movement. Other rattle pieces 42 can be mounted inside the bait 60 in conventional fashion.

Figure 6:
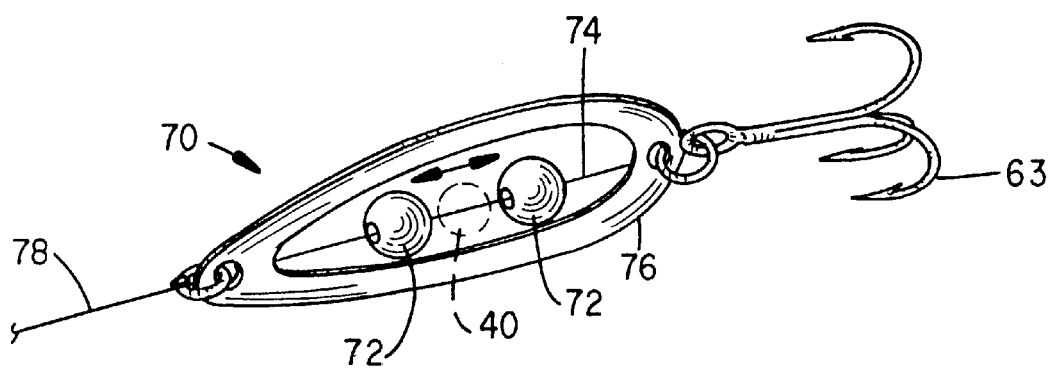
FIG. 6 is a perspective drawing showing a spoon lure containing magnets arranged for reciprocating motion on a sliding support.

A spoon-type lure 70 is shown in FIG. 6 that contains solid magnetic beads 72 that are strung to a filament support 74 in an aperture 75 through the spoon 70. The beads 72 are mounted to provide repulsive, reciprocating motion along the sliding support 74 as the lure body 76 wobbles and spins when drawn by a fishing line 78. A rattle bead 40 (shown in dashed line) or other sound enhancing spacer can be mounted between the beads 72.

Figure 7:
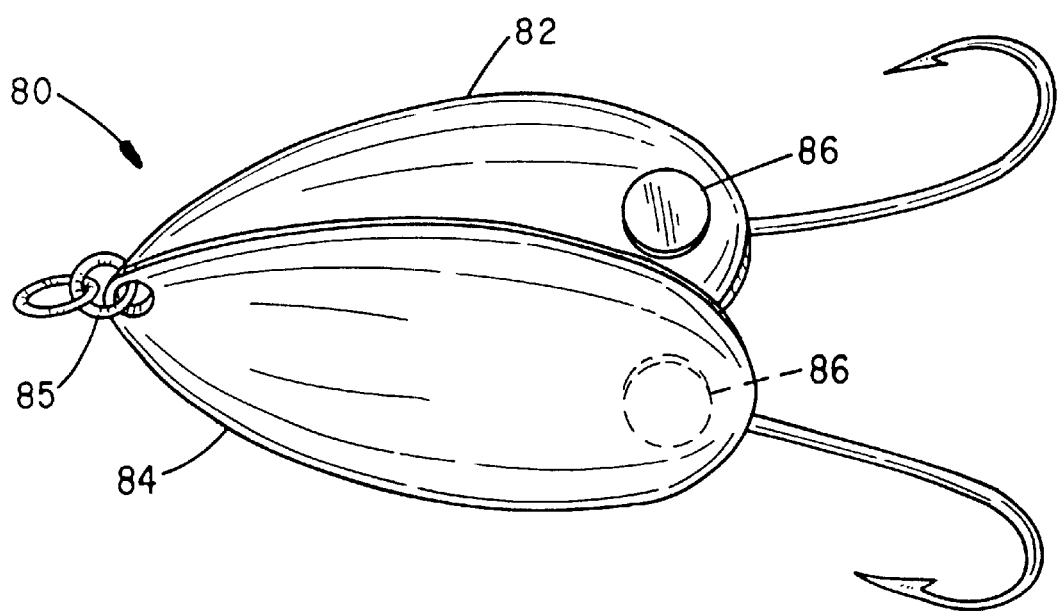
FIG. 7 is a perspective drawing showing a fishing lure with a pair spoons having repelling magnetic pieces.

FIG. 7 shows another construction of a spoon-type lure 80 that has concave spoon pieces 82 and 84 secured to pivot and flutter from a common split ring 85. Hooks 88 trail from the pieces 82 and 84. Magnets 86 secured to the spoon pieces 82 and 84 have their poles aligned to repel each other as the spoon pieces 82 and 84 are constrained by the ring 85 to flutter and contact each other. The size, shape, number and mounting location of the magnets 86 can be varied as desired. The spoon pieces 82 and 84, which are typically metallic, can also be selectively magnetized and oriented to achieve the desired repelling forces without having to attach separate magnets 86. The spoon pieces 82 and 84 might also include a support 74 and beads 72 in the fashion of FIG. 6.

Figure 8:
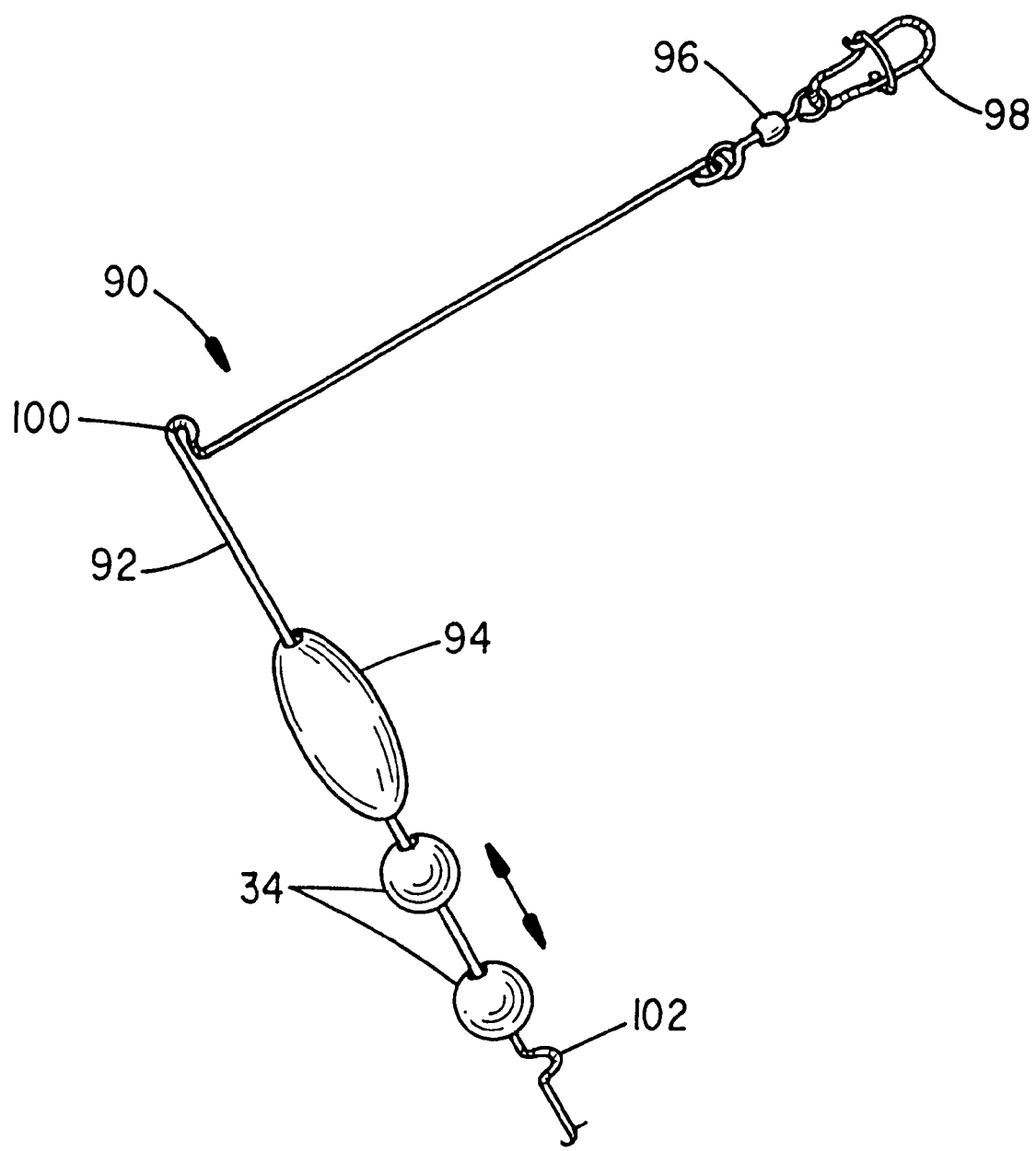
FIG. 8 is a perspective drawing to a bottom bouncer outfitted with repelling magnetic beads.

An audible wire form assembly 90 is shown at FIG. 8 such as might be found in a bottom bouncer. A bent wire support 92 is appropriately formed and outfitted with an ovular weight 94 and magnetic beads 34. A swivel 96 and snap clip 98 attach to a hook-containing lure not shown that trails from the clip 98. A fishing line mounts to the bend 100 and motion of the assembly 90 causes the beads 34 to interact with each other and the weight 94 or any other pieces fitted to the support 92 above the stop bend 102. The length of the support 92 can be sized as desired and the weight 94 can be attached to move or not as desired.

Other appropriately shaped wire forms that support magnetic pieces 12, magnetic beads 34 or 72 and/or solid beads 8 or 9 or rattle beads 40 can be constructed for other types of lures. Such wire forms might, for example, be included as part of a variety of known types of spinner baits and/or buzz baits.

Figure 9:
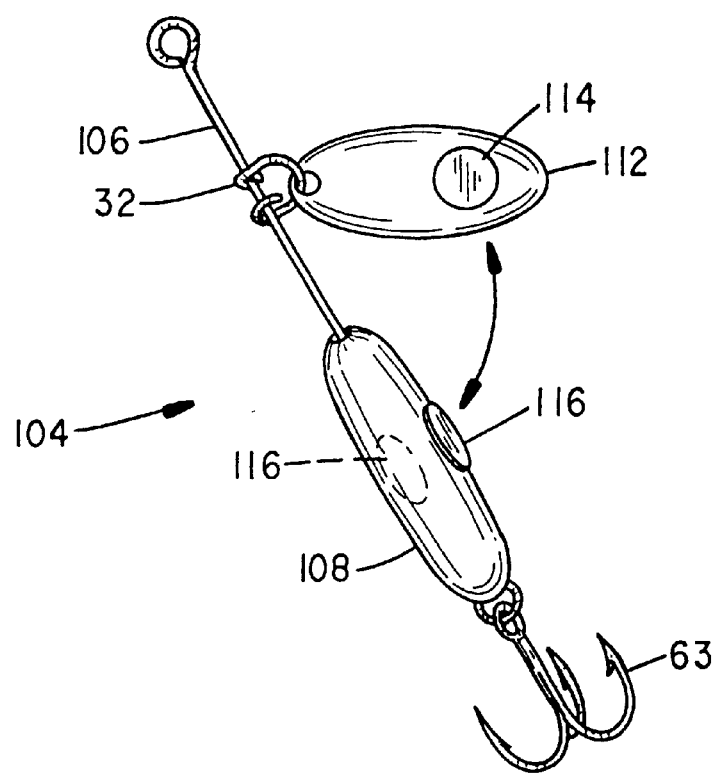
FIG. 9 is a perspective drawing to a spinner bait having repelling magnetic pieces fitted to a weighted body and spinner blade.

FIG. 9 shows a drawing of a spinner-bait 104 that has a wire support 106, a body piece 108 and a treble hook 63. The body 108 can be constructed from a weighted or buoyant material. A clevis 32 secures a spinner blade 110 to the support 106. Magnets 114 and 116 are attached to the blade 110 and body 108 to repel each other as the blade moves around and along the support 106. Multiple magnets 116 can be mounted around the body 108 to enhance the repelling and sound producing action between the blade 110 and body 108.

Figure 10:
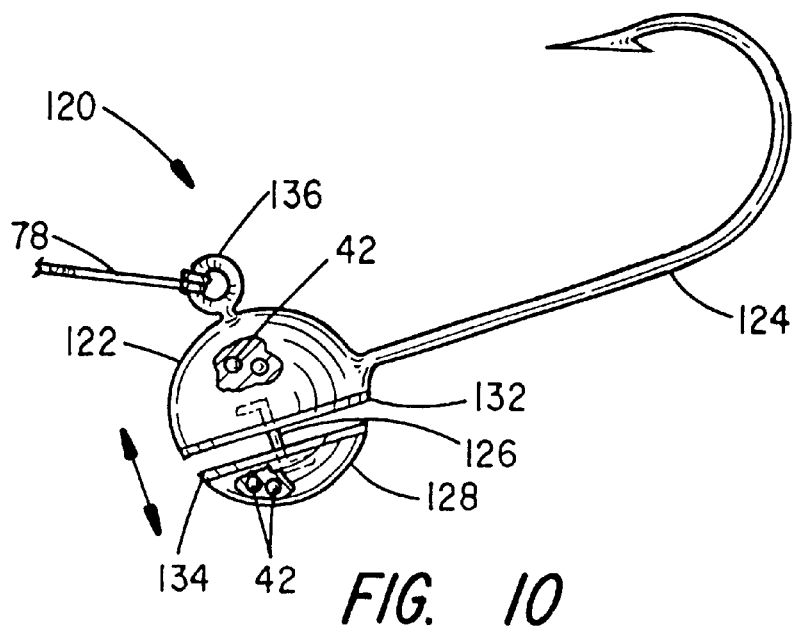
FIG. 10 is a perspective drawing to a jig head having repelling magnetic pieces mounted to a sliding support.

A jig-type lure 120 that has a head 122 molded to a hook 124 is shown at FIG. 10. A support 126 extends from the head 122 to a moveable headpiece 128. The head 128 is constrained to move back and forth along the support 126, although the support and head 128 can be made to both reciprocate relative to the head 122. Magnets 132 and 134 are secured in repelling relation to each other at the jig heads 122 and 128 to obtain reciprocating movement of the jig heads 122 and 128 along the support 126. A fish line 78 attached to an eye 136 induces interaction of the heads 122 and 128 as the jig 120 is drawn along a creek or lake bottom. Any of a variety of natural and artificial dressings can be attached to the lure 120. The headpieces 122 and 128 can also be formed to support rattle pieces 42 or capsules that contain rattles.

Figure 11:
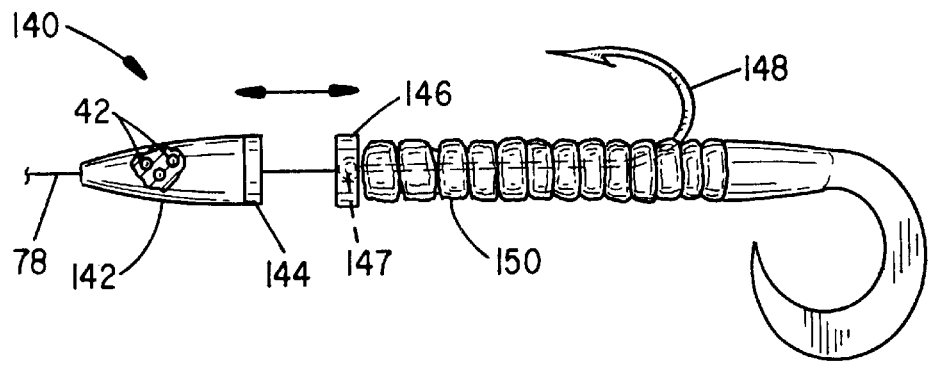
FIG. 11 is a perspective drawing showing a weighted live bait rig having repelling magnetic pieces fitted to the hook and sliding weight.

Still another hybrid variation of the lure assembly 20 and the lure 120 is shown at the lure 140 of FIG. 11. A weighted head 142 supports a magnet piece 144 that interacts with a repelling magnet piece or collar 146 that is attached around the eye 147 of a hook 148. Live bait can be mounted to the hook 148 or an artificial dressing 150 such as a plastisol tailpiece can be threaded onto the hook 148. Rattle pieces 42 can also be mounted within a sound chamber of the head 142.

Figure 12:
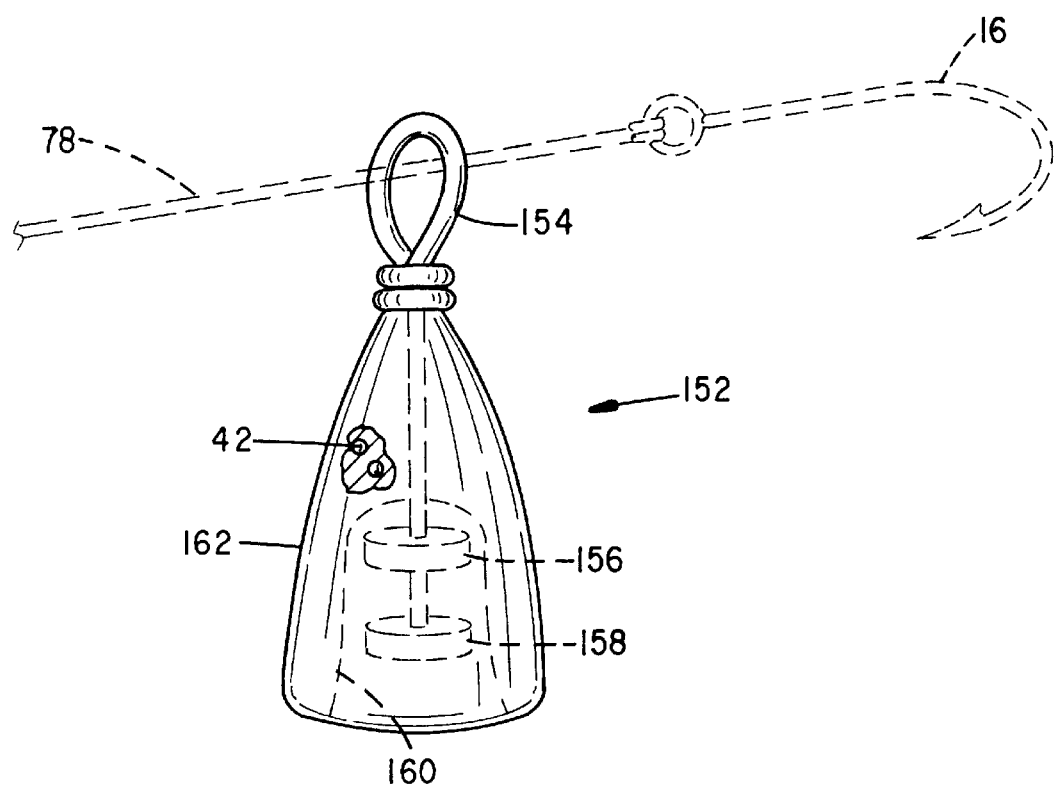
FIG. 12 is a perspective drawing showing a bell sinker having repelling magnetic pieces.

Lastly, FIG. 12 shows a bell sinker 152 that includes a bent wire stem 154 and to which repelling magnetic pieces 156 and 158 are mounted for reciprocating motion within a cavity space 160. Although a bell-shaped sinker is shown, the magnet pieces 156 and 158 can be mounted in a comparable fashion to sinkers of any other shape. The sinker body 162 might also be constructed to include rattle pieces 42 or from a material and/or shape to amplify the sounds produced by the magnet pieces 156 and 158 and/or rattle pieces 42.

The invention has been described with respect to a number of presently preferred constructions and considered improvements or alternatives thereto. However, still other constructions may be suggested to those skilled in the art. Selected ones of the foregoing features can also be applied alone or be arranged in different combinations at still other lures and/or assemblies. The foregoing description should therefore be construed to include all those embodiments within the spirit and scope of the following claims.

What is claimed is:

1. A fishing lure comprising:
  a) a filamentary support coupled to a fish hook;
  b) first and second magnetic members having magnetic poles and affixed to said filamentary support such that said first and second magnetic members are constrained to move in parallel relation to said filamentary support and wherein said first and second magnets are aligned to normally repel one another, whereby movement of said lure induces a reciprocating movement of said first and second magnets toward and away from one another.

2. A lure as set forth in claim 1 including a relatively heavy weight lure piece with respect to said first and second magnetic members mounted to move alone said filamentary support to precipitate movement of said first and second magnetic members and a plurality of spacers mounted between said first and second magnetic members and said weight.

3. A lure as set forth in claim 1 wherein said first and second magnetic members comprise lure pieces having through bores, wherein first and second magnets are mounted to said lure pieces, and wherein said filamentary support is threaded through said bores of said lure pieces.

4. A lure as set forth in claim 1 wherein said first and second magnetic members comprise first and second magnets having through bores mounted to first and second body pieces of a crank bait, wherein said hook is coupled to one of said body pieces, and wherein said filamentary support is mounted through said through bores.

5. A lure as set forth in claim 1 wherein said filamentary support and each of said first and second magnetic members is mounted to a bill piece of a crank bait.

6. A lure as set forth in claim 1 wherein said filamentary support and each of said first and second magnetic members is mounted within an aperture of a spoon bait.

7. A lure as set forth in claim 1 wherein said filamentary support is mounted to project from a jig head comprised of first and second head pieces, wherein said hook extends from one of said first and second head pieces, and wherein one of said first and second magnetic members is mounted to said first head piece and the other of said first and second magnetic members is mounted to said second head piece and said second head piece is mounted to move along said filamentary support.

8. A lure as set forth in claim 1 wherein said filamentary support comprises a bent wire, wherein each of said first and second magnetic members includes a through bore, and wherein said filamentary support is threaded through the bores of said first and second magnetic members.

9. A lure as set forth in claim 1 wherein said filamentary support comprises a formed wire and wherein a spinner blade and a relatively heavy weight with respect to said first and second magnetic members are mounted to said filamentary support.

10. A lure as set forth in claim 1 wherein said first and second magnetic members and a plurality of lure pieces are strung alone said filamentary support such that relative motion between said first and second magnetic members and lure pieces creates audible sounds.

11. A lure as set forth in claim 1 including a lure piece having a hollow cavity, wherein said filamentary support is supported to said lure piece and said first and second magnetic members are mounted in said cavity, and wherein said filamentary support includes a bored portion that attaches to a fish line secured to said hook.

12. A lure as set forth in claim 1 including a lure piece having a hollow chamber and wherein at least one rattle piece is mounted in said chamber to create audible sounds.

13. A lure as set forth in claim 1 including a plurality of lure pieces, wherein said first and second magnetic members comprise first and second magnets having through bores and wherein said filamentary support comprises a fishing line secured to said hook and threaded through each of said first and second magnets.

14. A fishing lure comprising:
  a) a filamentary support;
  b) first and second magnets having magnetic poles, wherein said first and second magnets each include a bore and said filamentary support is mounted through the bores, and wherein the magnetic poles of said first and second magnets are aligned to normally repel one another such that said first and second magnets move in a reciprocating fashion relative to each other along said filamentary support.

15. A lure as set forth in claim 14 including a spinner blade mounted to said filamentary support to rotate and flutter relative to said filamentary support.

16. A lure as set forth in claim 14 including a member mounted to said support having a hollow chamber and at least one rattle piece mounted in said chamber to create audible sounds with movement of said first and second magnets relative to said support.

17. A fishing lure comprising:
  a) a filamentary support coupled to a fish hook;
  b) first and second magnetic members having magnetic poles and including through bores, wherein said filamentary support is threaded through said bores and said poles are aligned to normally repel one another such that said first and second magnetic members are constrained to move along said filamentary support, whereby movement of said lure induces a reciprocating movement of said first and second magnets toward and away from one another.

18. A fishing lure comprising:
  a) a wire support including a portion formed to attach to a fish line and a portion formed to couple to a fish hook;
  b) first and second magnetic members having magnetic poles and including through bores, wherein said first and second magnet members are mounted at said through bores to said wire support, and wherein the magnetic poles of said first and second magnet members are aligned to normally repel one another, whereby movement of said lure induces a reciprocating movement of said first and second magnetic members toward and away from one another.

19. A lure as set forth in claim 18 including a spinner blade mounted to said wire support.

20. A lure piece having a hollow cavity and a filamentary support that extends into said cavity, wherein said filamentary member is threaded through bores of first and second magnetic members mounted in said cavity and magnetic poles of which magnetic members are aligned to repel one another, and wherein said filamentary support includes a bored portion that attaches to a fish line secured to said hooks.

* * * * *